March 28, 1939.  L. R. FINK  2,151,907
FILM PROCESSING DEVICE
Filed Jan. 20, 1938
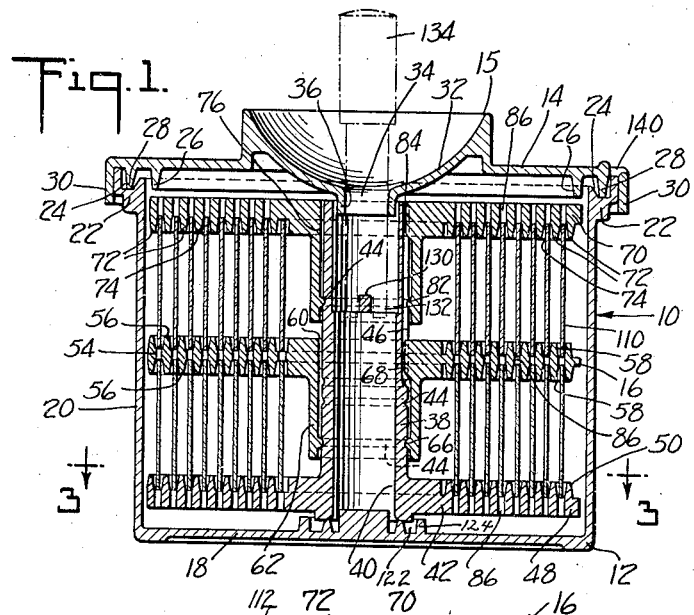
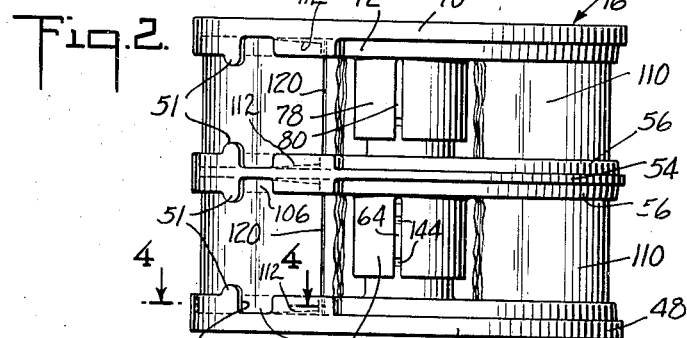
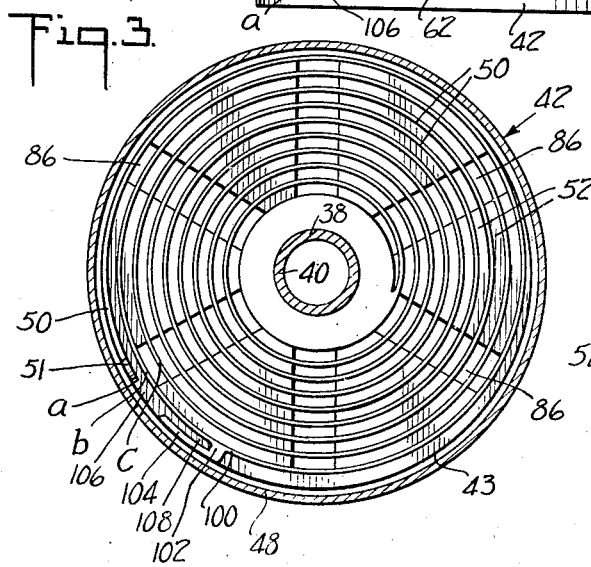
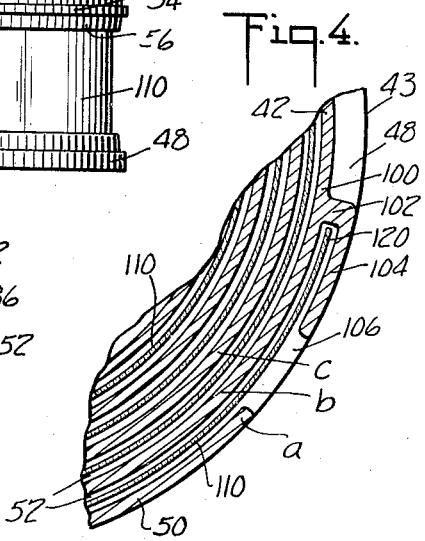
INVENTOR
Lawrence R. Fink
BY
W. R. Liberman
ATTORNEY Patented Mar. 28, 1939

2,151,907

UNITED STATES PATENT OFFICE 2,151,907

FILM PROCESSING DEVICE

Lawrence R. Fink, New York, N. Y., assignor to Fink-Roselieve Co. Inc., New York, N. Y., a corporation of New York Application January 20, 1938, Serial No. 185,802

6 Claims. (Cl. 242—104)

My invention relates to devices for developing and fixing, or otherwise treating strips or lengths of photographic film. Generally speaking, devices used for this purpose comprise a receptacle, usually circular, a cover therefor, and film supporting means therein. The film supporting means are commonly referred to as either a "reel" or "spool", and it is this portion of the device to which my invention is specifically directed.

In operation, the strip of exposed film is threaded or otherwise placed in the reel or spool, and the reel or spool disposed within the receptacle. The cover is then placed on the receptacle, and the liquid chemicals poured into the receptacle through a suitable opening, either in the cover or in the body of the receptacle. The reel is then revolved within the receptacle and all surfaces of the film strip thus brought into contact with the liquids. The conventional reel is provided with a pair of spaced apart plates or discs having helical or spiral grooves on their opposing faces, into which grooves the film is threaded. It has been found as a matter of good practice to space the discs apart a distance greater than the width of the film being treated so as to reduce friction and make it easy to insert and withdraw the film strip. The reel is constantly being revolved during the various processing steps, to thoroughly agitate the chemicals, and ofttimes the film strip slides out of the reel and rubs or scrapes against the inner walls of the receptacle. Prior inventors have sought to solve the problem thus presented by locking the film to the core of the reel or spool, but this made it necessary to insert the film strip from the core or inside of the reel to the outside. It is the main object of my invention to provide a reel for use in film developing tanks which may be loaded from the outside or periphery thereof having means at that point or adjacent thereto to prevent any retraction or sliding of the film out of the groove.

A further object of my invention is the provision of a reel for use in film developing tanks which has a plurality of discs relatively movable to each other, whereby a plurality of film strips may be received thereby.

A further object of my invention is the provision of a reel for use in film developing tanks having one fixed disc and a plurality of discs movable with respect thereto.

A further object of my invention is the provision of a reel for use in film developing tanks having one fixed disc at the bottom thereof, and a pair of discs movable with respect thereto, the centermost of which discs is provided with film receiving means on both faces thereof.

Further objects of my invention will in part be apparent and in part be pointed out specifically in connection with the following description of an illustrative embodiment.

In the drawing annexed hereto and made a part hereof,

Fig. 1 is a transverse view through one form of film treating device constructed according to and embodying my invention, including the novel reel of my invention with a plurality of strips of film in place therein;

Fig. 2 is a side elevational view of the reel illustrated in Fig. 1, with portions of the film broken away to show details of interior construction;

Fig. 3 is a plan view of the face of one of the discs of the reel, viewed along the line 3—3 of Fig. 1; and Fig. 4 is an enlarged plan view of a portion of the inner face of one of the discs of the reel, viewed along the line 4—4 of Fig. 3, illustrating the details of the film lock of my invention.

Referring to the drawing, the device as a unit is indicated by reference numeral 10, and comprises circular receptacle 12, cover 14, and reel 16. Receptacle 12 has bottom 18 and vertically rising wall 20. The upper edge of wall 20 is extended outwardly to form lip 22 which has an annular groove 24 formed therein. Cover 14 is also circular, and is provided with a plurality of concentric, downwardly depending flanges 26, 28, 30, which interfit with the raised portions of lip 22 to form a plurality of staggered passages to prevent light from entering the interior of the receptacle. The center of cover 14 has a raised portion 15, the interior of which is dished, as at 32, with an opening 34 therethrough having downwardly depending flange 36 outlining the opening, the dished portion acting as a funnel whereby the liquids may more easily be poured into the tank.

Reel 16 comprises core 38, which is slightly tapered, for reasons to be explained below. Core 38 is generally circular in cross-section, and is hollow, as indicated at 40. Core 38 has circular disc 42 formed integral therewith at the bottom or wider end thereof, which disc 42 extends outwardly from and at right angles to core 38. A number of annular grooves 44 are formed in core 38, as is a vertical groove 46 which extends from the top of core 38 to below the center thereof, the functions of which grooves 44, 46 will be explained below. Disc 42 has a base portion 48 on the inner face of which is formed a helical wall 50, which defines a helical groove 52.

A second disc 54 is provided having a helical wall 56 on each face thereof, which walls 56 define a helical groove 58 on each of the disc faces. Disc 54 has an opening 60 in the center thereof, and has a hub or collar 62 extending downwardly therefrom. Hub 62 is provided with slits 64 extending the length thereof. All the component parts of the device, the receptacle, cover, reel core, discs, etc. are formed of molded plastics material, and the slits 64 in collar 62 provide a spring in that, as the disc 54 is slid down along the tapered core 38, the collar 62 will open and expand. The inside of collar 62 is provided with an annular rib 66 which fits within annular grooves 44 to lock the disc 54 in any one of several desired positions in relation to the fixed disc 42 at the bottom of the core. The inside of collar 62 is also provided with a button 68 which is received within groove 46 to position disc 54 against rotation about core 38.

A third disc 70 is provided, the underside of which is provided with a helical wall 72 defining a helical groove 74. This disc 70 also has an opening 76 in the center thereof, and has a hub or collar 78 extending downwardly therefrom. Hub 78 is provided with slits 80 extending the length thereof. These slits 80 provide a spring action similar to that detailed above in connection with collar 62, and the inside of collar 78 is provided with an annular rib 82 and a button 84 whereby disc 70 may also be positioned as desired with respect to the fixed disc 42. Each of these three discs is provided with openings 86 through the faces thereof, in order that the liquid poured into the tank may pass through said openings to contact the surfaces of the film being processed.

Referring to Figs. 3 and 4, it will be seen that the helical wall 50 begins near or at the outside edge or periphery of the disc 42. The radius of curvature of the wall, in following the helical path, necessarily becomes constantly smaller, and there is more or less a concentricity established between successive convolutions of the wall, the space between defining the helical groove 52 in disc 42. The same is true of both faces of disc 54 and the lower face of disc 70. Thus, starting from the edge of disc 42, wall 50 begins at $a$ and the first complete "convolution" is completed at $b$, at which point the wall is spaced sufficiently in from the edge of the disc 42 to provide the beginning of a groove or track. The third convolution of the wall 50 is completed at region $c$, defining the first complete "convolution" of groove 52. At the region $a$ where the wall begins, there is provided a raised portion 51.

Following the path of wall 50 from its beginning $a$ around to the region $b$, or the first convolution, it will be seen that the wall 50 is spaced increasingly in from the edge 43 of disc 42. This distance from the edge is greatest at the end of the first convolution at region $b$. However, in order to provide adequate clearance for inserting the film strip without the necessity for any bending thereof, I provide my lock or safety at a region where the wall 50 is spaced in from edge 43 at a distance substantially similar to that at region $b$, for instance, at 100, see Figs. 3 and 4. At this point, which is seen in Figs. 3 and 4 to be disposed rearwardly of the beginning of wall 50, I provide a wall having a straight portion 102 which extends outwardly from wall 50, at right angles thereto, to the edge 43, where it is bent over and takes the curvature of disc 42; the curved wall portion 104 stopping short of the beginning of wall 50 at $a$ and leaving a space 106 therebetween for the entrance of film into the groove 52. The right angled wall thus forms a pocket 108 between the beginning of wall 50 and the convoluted part thereof into which the film may be disposed against accidental dislodgment.

In operation, disc 54 is threaded onto tapered core 38 and pushed down against the taper thereof, until the desired distance from disc 42 is reached, at which point rib 66 will be received into groove 44, and button 68 fitted into groove 46, to align the opposing faces of the two discs with the entrances 106 opposite each other. Film strip 110 is then inserted through entrance 106 and threaded into the groove 52 and pushed around the helical path thereof until the entire film length is received within the convolutions of the reel. The end 120 of the film is then retracted within the pocket 108. When in the pocket, the film will be removed from all contact with the inside of wall 20 and will be secured against any movement out of the reel. Additionally, the floor 112 of pocket 108 may be raised from the bottom thereof, so that, if desired, the end 120 may be friction locked within pocket 108.

As shown in Fig. 1, the bottom of receptacle 12 is provided with an interior central stud 122, which comprises a plurality of concentric walls 124, on which the bottom of core 38 rests, spacing the lowermost disc 42 from the bottom of the receptacle. The reel is of such height with relation to the depth of the receptacle that the flange 36 of cover 14 fits into the mouth of core 38 when the parts are disposed in the operative position of Fig. 1.

The reel of my invention has one fixed disc 42 at the bottom thereof, with a helical groove on the upper face thereof. The second disc 54 has helical grooves 58 on both faces thereof, and the third disc 70 has a helical groove 74 on the bottom face thereof, so that, if desired, my device can accommodate two separate film strips. The provision, in the centermost disc, of grooves on both faces thereof makes it possible by the use of disc 70 to double the capacity of the device.

Most film is of standard size, and annular grooves 44 may be provided at predetermined distances apart to accommodate the known film sizes. The provision of the conventional arrangement of groove 46 and buttons 64 and 84 makes it possible to lock the movable discs with respect to the fixed disc so that the entrances 106 of the opposing disc faces will be transversely aligned and locked against displacement from the aligned position.

The liquid is poured into the dished portion of the cover, thence through the hollow core of the reel to the bottom of the tank. It then rises upwardly through openings 86 and the space between the reel and the receptacle walls. To secure optimum results, it is desirable to agitate the liquids and for this purpose, a cross bar 130 is provided within core 38 which is received within the split end 132 of handle 134, whereby the reel 16 may be rotated from the outside during the processing operation. The fit of flange 36 within the mouth of core 38, and the interfit between the lip of the receptacle and the flanges of the cover, make the tank light-tight, and once the film is fed into the reel and the cover put on, the remaining operations may safely be carried on in daylight.

An opening 140 may be provided in the outer edge of cover 14, to provide an overflow for liquids during the processing operations, and once the cover is put on the receptacle, it may be kept on until the final washing operation is completed.

Having now described my invention, what I claim and desire to secure by Letters Patent is:

1. A reel for use in film developing tanks comprising a central core, a fixed disc thereon having film receiving means on one side thereof, and a pair of movable discs thereon, the centermost of the discs having film receiving means on both sides thereof which cooperate with film receiving faces on the opposing sides of the fixed disc and the other movable disc.

2. A reel for use in film developing tanks comprising a central core, a disc fixed thereon at one end thereof, a second disc on said core movable with respect to said fixed disc, the opposing faces of said first and second discs having cooperating film receiving means thereon, and a third disc on said core movable with respect to the opposing faces of said first and second disc, said third disc and second disc having cooperating film receiving means thereon.

3. A reel for use in film developing tanks comprising a pair of spaced apart discs each of which has a helical film receiving groove thereon, the path of the helix being in from the outermost convolution thereof, an opening in each of said grooves near the beginning thereof for the entrance of film thereinto, and a wall portion across the groove at the beginning thereof, adjacent the opening, for locking the film against accidental displacement from the grooves.

4. A reel for use in film processing tanks comprising a pair of spaced apart circular discs, the opposing face of each of which is provided with a helical film receiving groove, each of which faces has an entrance into the groove in from the periphery of the disc, and the discs being disposed with the entrances in transverse alignment, each of which discs is provided with a film receiving pocket thereon as an integral part of the disc spaced from said entrance to secure the film within the grooves against displacement therefrom.

5. A reel as defined in claim 4 in which the discs are spaced apart a distance greater than the width of the film to be used, and the pocket floors are inclined to provide a friction lock between the film and the pocket floors whereby to secure the film within the grooves.

6. In a reel for use in film developing tanks, a disc comprising a circular base portion and a helical wall thereon in from the periphery of the base, the successive convolutions of which define a film receiving groove, a substantially right angle wall portion on said base, spaced from the beginning of the helical wall to define an entrance for film into the groove, which right angle wall portion, with a successive portion of the helical wall, forms a film receiving pocket on said base.

LAWRENCE R. FINK.